United States Patent Office 2,819,299
Patented Jan. 7, 1958

2,819,299

ADDITION PRODUCTS OF CONJUGATED FATTY ACIDS AND ACETYLENE CARBOXYLIC ACID

Howard M. Teeter and Morris J. Danzig, Peoria, Ill., assignors to the United States of America as represented by the Secretary of Agriculture No Drawing. Application November 2, 1956
Serial No. 620,158

2 Claims. (Cl. 260—514)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to the addition product of acetylene carboxylic acid and 9,11-octadecadienoic acid which has particular value as an intermediate for the preparation of synthetic resins, plasticizers, and adhesives and for the preparation of aromatic compounds from glyceride oils, and to a process for its preparation.

In accordance with the invention the aforesaid addition product, or adduct as it may be called, is prepared by reaction of acetylene carboxylic acid with 9,11-octadecadienoic acid, the latter being derived from conjugated linoleic acid and the conjugated fatty acids of vegetable semi-drying oils containing a high percentage of linoleic acid, such as soybean oil, safflower oil, sunflower oil, cottonseed oil, and other glyceride oils. Processes for producing such conjugated fatty acids from such naturally-occurring fatty acids are well known in the art. The reaction which takes place is illustrated by the equation below:

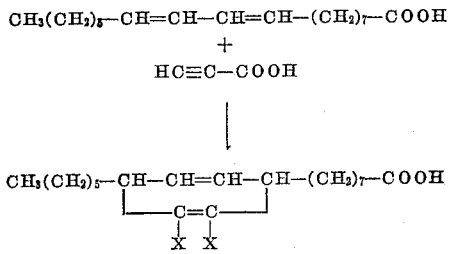

wherein one X is hydrogen, the other —COOH.

The process of the invention essentially involves contacting the acetylene carboxylic acid with 9,11-octadecadienoic acid. The temperature of reaction is not critical. Usually the temperature is at least 50° C. so that the reaction will take place at a practicable rate. On the other hand, the upper limit of temperature should be about 200° C. to minimize polymerization of 9,11-octadecadienoic acid. In general, a temperature around 130–150° C. is preferred. The two reactants are usually used in equimolar proportions, although it is preferred to employ an excess of the acetylene carboxylic acid to ensure complete reaction. To assist in getting maximum contact between the reactants, it is preferred to employ a solvent. Some of the solvents which may be used are benzene, toluene, xylene, chloroform, heptane, mixtures of petroleum hydrocarbons and the like. It is obvious that other inert, volatile organic solvents can be employed. To enable the use of a temperature above the boiling point of the solvent, it is preferred to maintain the reaction mixture of acetylene carboxylic acid, 9,11-octadecadienoic acid and solvent in a sealed vessel capable of resisting the resulting super-atmospheric pressure. At a temperature of about 130° C.–150° C. the reaction will be complete in about 12–48 hours.

As noted above, the products of the invention are useful for a variety of purposes. As an example, the addition product may be condensed with a polyamine such as ethylene diamine by the method described by Cowan et al., U. S. Patent No. 2,450,950, and Falkenburg, U. S. Patent No. 2,550,682, to prepare polyamide resins. These resins are useful for example in producing protective coatings on surfaces, as adhesives for paper and other packaging materials, for producing laminated products such as glass fiber laminates for insulating purposes. The addition product may be esterified in the manner of Izard, U. S. Patent No. 1,991,391, with alcohols such as methyl alcohol, butyl alcohol, 2-ethyl hexyl alcohol, and ethoxyethyl alcohol to produce di-esters which are useful for plasticizing polyvinyl chloride resins. The product of the invention may also be condensed with polyhydric alcohols such as glycol, glycerol, pentaerythritol, etc., to produce polyesters which are useful for coatings, castings, and other applications for which the general class of polyester resins are suited.

A unique use of the addition product of the invention concerns its conversion by organic synthesis into aromatic derivatives. For example, by the procedure demonstrated in Example 2 one can prepare trimellitic acid. This compound may be used to prepare dye intermediates. Thus the trimellitic acid is sulphonated in accordance with the process U. S. Patent 2,285,483 and the resulting sulphonic acid is further treated as in Beilstein, 4th ed., vol. X, p. 580 (1927), to prepare 5-hydroxy mellitic acid which is useful as a dyestuff intermediate as disclosed in French Patent No. 839,454, Chemical Abstracts 36, 5188 (1942).

The following specific examples illustrate the invention:

*Example 1*

A benzene solution containing 1.5 moles of acetylene carboxylic acid and 1 mole of 9,11-octadecadienoic acid was held in a sealed vessel at a temperature of 130° C. for 24 hours. At the end of this time the solvent was removed by evaporation and the product was purified by adsorbing it on a column of silicic acid followed by eluting the product with benzene. A quantitative yield of the adduct of acetylene carboxylic acid and 9,11-octadecadienoic acid was obtained. This product had the following analysis: Calculated: carbon, 71.96; hydrogen 9.78. Found: carbon, 71.54; hydrogen, 9.56. The product was a liquid.

*Example 2*

This example illustrates the utility of the product of our invention as an intermediate for the production of an aromatic derivative from a vegetable oil compound. A solution in 25 ml. of xylene of 0.81 g. of the product of Example 1 was refluxed with 0.5 percent of palladium on carbon catalyst. As the solution was refluxed, the theoretical volume of hydrogen gas was liberated and was measured with a gas burette. After the theoretical volume (1 mol. $H_2$ per mol. of adduct) of hydrogen had been liberated, the product was isolated by removing solvent and catalyst. An 84.8 percent yield of the aromatic dehydrogenated derivative having a melting point of 64° to 70° C. was obtained. Ultraviolet spectroscopy showed that the product had a benzenoid structure: Peak at 2850 mu;

$E_{1cm.}^{1\%}$, 1,119 shoulder at 2225 mu;

$E_{1cm.}^{1\%}$, 6,091

A solution of 0.52 g. of the above aromatic product, 4.5 g. of potassium permanganate, 4.0 ml. of 10 percent aqueous sodium hydroxide and 90 ml. of water was refluxed for 4 hours with constant stirring. The product (0.23 g., 67%) melted at 210–225° C. Trituration with hot benzene sharpened the melting point to 224–225° C. Mixed melting point tests with a sample of authentic trimellitic acid showed that the product was trimellitic acid.

Having thus described the invention, we claim:

1. An adduct of acetylene carboxylic acid and 9,11-octadecadienoic acid having the formula

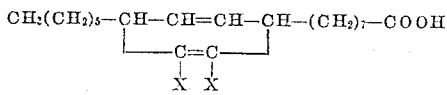

wherein one X is hydrogen and the other X is —COOH.

2. A process comprising reacting substantially equimolar proportions of acetylene carboxylic acid and 9,11-octadecadienoic acid dissolved in an inert, volatile organic solvent at a temperature ranging from about 50° C. to 200° C. for about from 12 to 48 hours to produce the adduct of said reactants having the formula

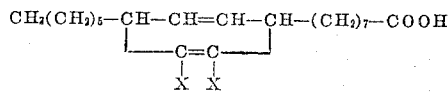

wherein one X is hydrogen and the other X is —COOH.

References Cited in the file of this patent

UNITED STATES PATENTS 2,648,693     Schmerling _____ Aug. 11, 1953

OTHER REFERENCES

Norton: Chemical Review, vol. 31, pp. 328–329 (1942).
Holmes: Organic Reactions, vol. IV, pp 60–90 (1948).